United States Patent
Bellert

(10) Patent No.: US 10,268,920 B2
(45) Date of Patent: Apr. 23, 2019

(54) DETECTION OF NEAR RECTANGULAR CELLS

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/692,683

(22) Filed: Aug. 31, 2017

(65) Prior Publication Data
US 2019/0065887 A1 Feb. 28, 2019

(51) Int. Cl.
G06K 9/48 (2006.01)
G06K 9/46 (2006.01)
G06K 9/52 (2006.01)
G06K 9/42 (2006.01)

(52) U.S. Cl.
CPC ............ *G06K 9/4676* (2013.01); *G06K 9/42* (2013.01); *G06K 9/4604* (2013.01); *G06K 9/469* (2013.01); *G06K 9/52* (2013.01)

(58) Field of Classification Search
None
See application file for complete search history.

(56) References Cited

U.S. PATENT DOCUMENTS

| | | | | |
|---|---|---|---|---|
| 8,634,645 B2 * | 1/2014 | Xing | ................... | G06K 9/00422 382/181 |
| 9,697,423 B1 * | 7/2017 | Bellert | ............... | G06K 9/00456 |
| 9,898,683 B2 * | 2/2018 | Bellert | ................. | G06K 9/4633 |
| 9,977,979 B2 * | 5/2018 | Bellert | ................... | G06K 9/342 |
| 10,002,306 B2 * | 6/2018 | Bellert | ................... | G06K 9/342 |
| 10,083,218 B1 * | 9/2018 | Bellert | ............. | G06F 17/30595 |
| 2005/0063592 A1 * | 3/2005 | Li | ...................... | G06K 9/00476 382/181 |
| 2007/0140566 A1 * | 6/2007 | Lin | .................... | G06K 9/00416 382/203 |
| 2007/0186152 A1 * | 8/2007 | Gurcan | ................. | G06F 17/211 715/209 |
| 2009/0245645 A1 * | 10/2009 | Xing | .................... | G06F 17/245 382/189 |

(Continued)

OTHER PUBLICATIONS

Whiteboard scanning and image enhancement, Zhang et al., Elsevier, 2006, pp. 414-432 (Year: 2006).*

*Primary Examiner* — Jayesh A Patel
(74) *Attorney, Agent, or Firm* — Osha Liang LLP

(57) ABSTRACT

A method for image processing is provided. The method includes: generating a skeleton graph associated with the table and comprising a plurality of edges; identifying, in the skeleton graph, a corner vertex, a starting vertex adjacent to the corner vertex, and an ending vertex adjacent to the corner vertex; determining a set of route options for the starting vertex that includes a first set of vertices adjacent to the starting vertex; selecting a candidate vertex from the first set of vertices as a first vertex; determining a set of route options for a second vertex comprising a second set of vertices adjacent to the second vertex; determining the second set of vertices comprises the ending vertex; and generating a route for a cell in the table and comprising the corner vertex, the starting vertex, the first vertex, the second vertex, and the ending vertex.

20 Claims, 12 Drawing Sheets

(56) References Cited

U.S. PATENT DOCUMENTS

| | | | |
|---|---|---|---|
| 2013/0044954 A1* | 2/2013 | Ashbrook | G06F 21/36 |
| | | | 382/187 |
| 2014/0029853 A1* | 1/2014 | Xue | G06K 9/18 |
| | | | 382/182 |
| 2017/0177931 A1* | 6/2017 | Fang | G06K 9/00422 |
| 2017/0344847 A1* | 11/2017 | Bellert | G06K 9/4633 |
| 2018/0005067 A1* | 1/2018 | Bellert | G06K 9/342 |

* cited by examiner

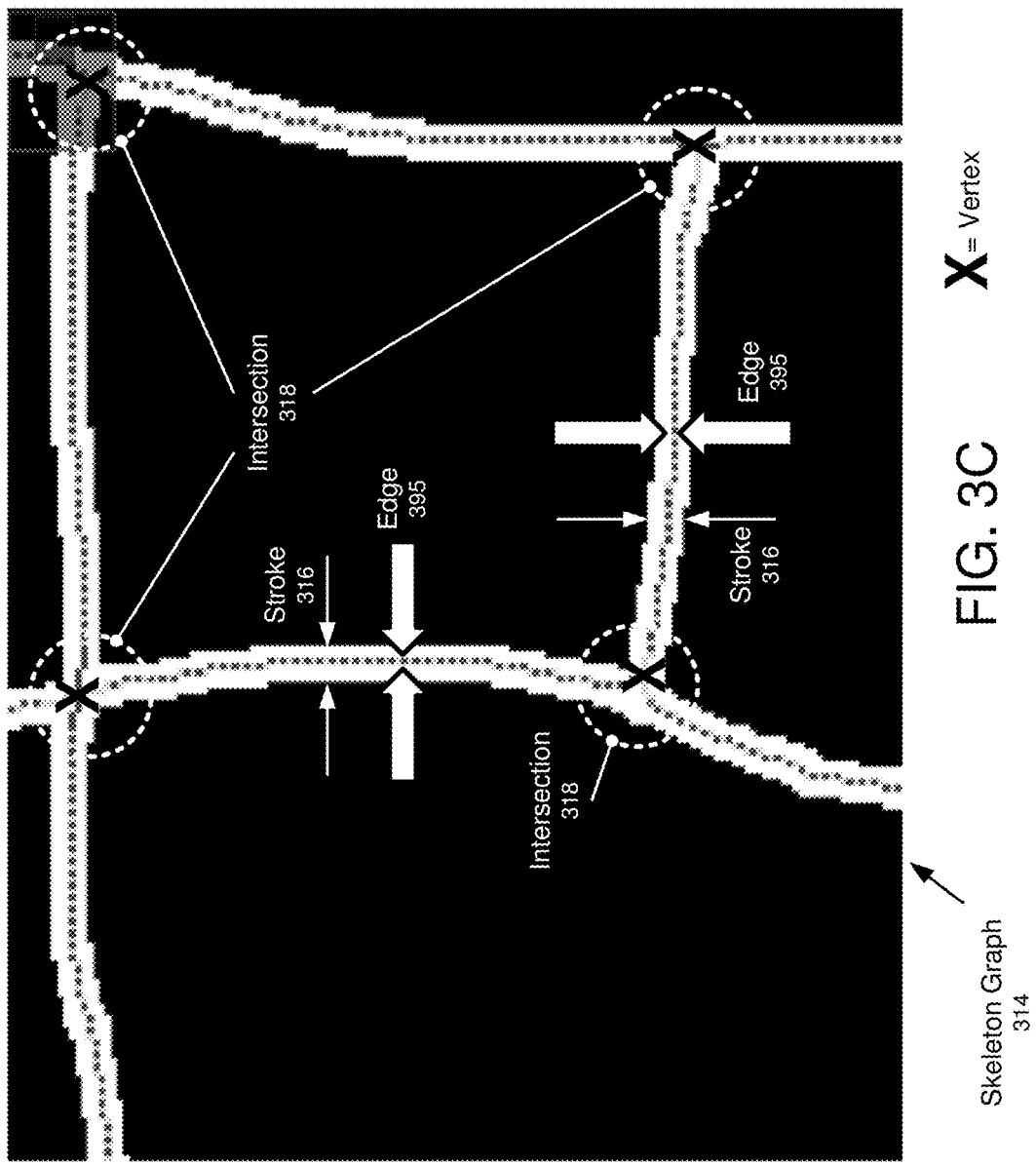

| Corner Vertex | Starting Vertex | Ending Vertex |
|---|---|---|
| 27 | 23 | 5 |

FIG. 4B ← Visited Vertices (VV) data structure 403

| ROs | vertex | cur travel vec | new travel vec | turn cost |
|---|---|---|---|---|
| | 23 | (7, -43) | (124, -9) | 0 |

FIG. 4C ← Route Option (RO) data structure 405A

| ROs | vertex | cur travel vec | new travel vec | turn cost |
|---|---|---|---|---|
| | 25 | (124, -9) | (124, -9) | 0 |
| | 26 | (124, -9) | (130, -6) | 89 |
| | 24 | (124, -9) | (-6, -7) | 144 |

FIG. 4D ← RO data structure 405B

| ROs | vertex | cur travel vec | new travel vec | turn cost |
|---|---|---|---|---|
| | 29 | (124, -9) | (-3, 69) | 7 |
| | 26 | (124, -9) | (130, -6) | 89 |
| | 24 | (124, -9) | (-6, -7) | 144 |

FIG. 4E ← RO data structure 405C

| TH | ROs | vertex | cur travel vec | new travel vec | turn cost |
|---|---|---|---|---|---|
| | | 26 | (124, -9) | (130, -6) | 89 |
| | | 24 | (124, -9) | (-6, -7) | 144 |

Turn History (TH) data structure 407

FIG. 4F

| VVs | 5 | 27 | 23 | 25 | 29 | 6 |
|---|---|---|---|---|---|---|

VV data structure 403

FIG. 4G

| CF | 5 | 6 | 23 | 24 | 25 | 26 | 27 | 29 | 30 |
|---|---|---|---|---|---|---|---|---|---|
| | 5 | 29 | 27 | 23 | 23 | 23 | 5 | 25 | 29 | cameFrom data structure 409

FIG. 4H

Route Options (RO) data structure 503

| ROs | vertex | cur travel vec | new travel vec | turn cost |
|---|---|---|---|---|
| | 11 | (169, -1) | (49, 2) | 87 |
| | 4 | (169, -1) | (-24, 62) | 21 |

FIG. 5B

Turn History (TH) data structure 507

| TH | ROs | vertex | cur travel vec | new travel vec | turn cost |
|---|---|---|---|---|---|
| | | 11 | (169, -1) | (49, 2) | 87 |

FIG. 5C

DETECTION OF NEAR RECTANGULAR CELLS

BACKGROUND

An image may include a table with rows and columns bounded by hand-drawn lines. For example, the image may be a scan of a hand-drawn page. As another example, the image may be a photograph of a writing board on which a table has been drawn with markers. These hand-drawn lines are rarely straight, making it difficult for image processing devices to determine the geometry of the table (e.g., upper left corner, extents, number of rows and columns, cell positions). These hand-drawn lines also make it difficult to generate a high-level representation of the table that can be included in an electronic document (e.g., word processing document, spreadsheet, slide show, webpage, etc.). Regardless, users still wish to have image processing devices operate on hand-drawn tables or any table in an image.

SUMMARY

In general, in one aspect, the invention relates to a method for image processing. The method comprises: generating a skeleton graph associated with the table and comprising a plurality of edges; identifying, in the skeleton graph, a corner vertex, a starting vertex adjacent to the corner vertex, and an ending vertex adjacent to the corner vertex; calculating a travel direction from the corner vertex to the starting vertex; determining a set of route options for the starting vertex comprising: a first set of vertices adjacent to the starting vertex in the skeleton graph; a set of travel directions from the starting vertex to the first set of vertices; and a set of turn costs for the first set of vertices based on the set of travel directions and a perpendicular of the travel direction from the corner vertex to the starting vertex; selecting a candidate vertex from the first set of vertices as a first vertex based on the set of turn costs; determining a set of route options for a second vertex comprising a second set of vertices adjacent to the second vertex in the skeleton graph; determining the second set of vertices comprises the ending vertex; and generating a route for a cell in the table and comprising the corner vertex, the starting vertex, the first vertex, the second vertex, and the ending vertex.

In general, in one aspect, the invention relates to a system for image processing. The system comprises: a memory; and a computer processor connected to the memory that: generates a skeleton graph associated with the table and comprising a plurality of edges; identifies, in the skeleton graph, a corner vertex, a starting vertex adjacent to the corner vertex, and an ending vertex adjacent to the corner vertex; calculates a travel direction from the corner vertex to the starting vertex; determines a set of route options for the starting vertex comprising: a first set of vertices adjacent to the starting vertex in the skeleton graph; a set of travel directions from the starting vertex to the first set of vertices; and a set of turn costs for the first set of vertices based on the set of travel directions and a perpendicular of the travel direction from the corner vertex to the starting vertex; selects a candidate vertex from the first set of vertices as a first vertex based on the set of turn costs; determines a set of route options for a second vertex comprising a second set of vertices adjacent to the second vertex in the skeleton graph; determines the second set of vertices comprises the ending vertex; and generates a route for a cell in the table and comprising the corner vertex, the starting vertex, the first vertex, the second vertex, and the ending vertex.

In general, in one aspect, the invention relates to a non-transitory computer readable medium (CRM) storing computer readable program code embodied therein. The program code, when executed: generates a skeleton graph associated with the table and comprising a plurality of edges; identifies, in the skeleton graph, a corner vertex, a starting vertex adjacent to the corner vertex, and an ending vertex adjacent to the corner vertex; calculates a travel direction from the corner vertex to the starting vertex; determines a set of route options for the starting vertex comprising: a first set of vertices adjacent to the starting vertex in the skeleton graph; a set of travel directions from the starting vertex to the first set of vertices; and a set of turn costs for the first set of vertices based on the set of travel directions and a perpendicular of the travel direction from the corner vertex to the starting vertex; selects a candidate vertex from the first set of vertices as a first vertex based on the set of turn costs; determines a set of route options for a second vertex comprising a second set of vertices adjacent to the second vertex in the skeleton graph; determines the second set of vertices comprises the ending vertex; and generates a route for a cell in the table and comprising the corner vertex, the starting vertex, the first vertex, the second vertex, and the ending vertex.

Other aspects of the invention will be apparent from the following description and the appended claims.

BRIEF DESCRIPTION OF DRAWINGS

FIGS. 3A-3C show an implementation example in accordance with one or more embodiments of the invention.

FIGS. 4A-4H show an implementation example in accordance with one or more embodiments of the invention.

FIGS. 5A-5C show an implementation example in accordance with one or more embodiments of the invention.

DETAILED DESCRIPTION

Figure 1:
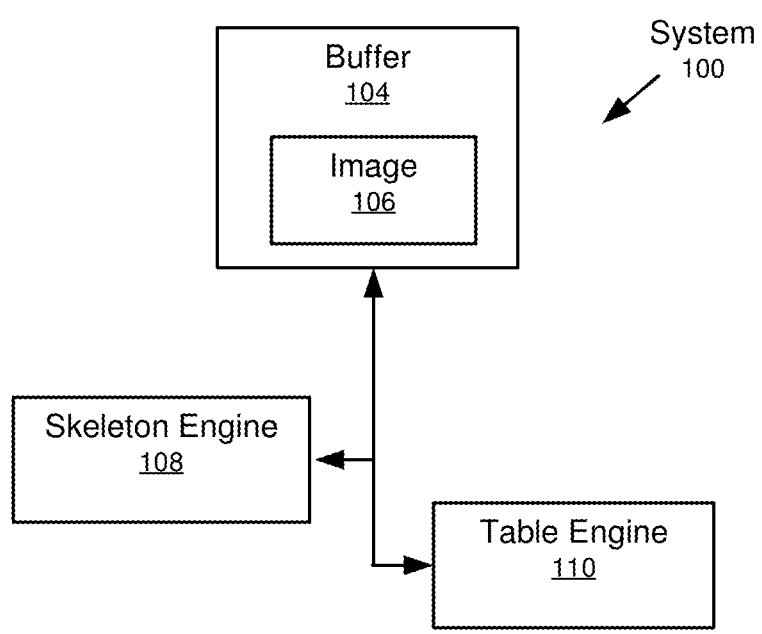
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system of image processing for detecting cells in a hand-drawn table. Specifically, an image including a table with one or more cells is obtained. The image is converted into a mask, and a skeleton graph that includes edges and vertices representing the table is generated. One or more processes are executed on the skeleton graph to identify the edges and vertices that form the cells of the table. With these edges and vertices identified, a high-level representation of the table may be generated for inclusion in an electronic document (e.g., OOXML document, PDF document, etc.).

FIG. 1 shows a system (100) in accordance with one or more embodiments of the invention. As shown in FIG. 1, the system (100) has multiple components, including, for example, a buffer (104), a skeleton engine (108), and a table engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (104) may be implemented in hardware (i.e., circuitry), software, or any combination thereof. The buffer (104) is configured to store an image (106) including a table having any number of rows and columns. Each cell of the table may have text and/or graphics. The image (106) may be obtained (e.g., downloaded, scanned, etc.) from any source. Further, the image (106) may be of any size and in any format (e.g., JPEG, GIF, BMP, PNG, etc.). In one or more embodiments, the image (106) includes a writing board (e.g., blackboard, whiteboard, etc.), and the table is drawn on the writing board with a marker.

In one or more embodiments of the invention, the skeleton engine (108) may be implemented in hardware (i.e., circuitry), software, or any combination thereof. The skeleton engine (108) converts the image (106) to a mask (e.g., a binary image) in order to facilitate the identification of hand-drawn lines in the table and/or text characters in the table.

Those skilled in the art, having the benefit of this detailed description, will appreciate that a standard coordinate system for the image (106) may exist. However, if the hand-drawn table is rotated within the image (106), the axes of this standard coordinate system might not align with the rows and columns of the table. In one or more embodiments of the invention, the skeleton engine (108) establishes a custom coordinate system with perpendicular axes that closely align with the rows and columns of the table in the image (106). Alternatively, the image may be rotated to better align the rows and columns of the table with the standard coordinate system of the image (106).

In one or more embodiments of the invention, the skeleton engine (108) generates a skeleton graph for the table in the image (106). The skeleton graph includes a series of edges and vertices that represent the hand-drawn table. Each edge may correspond to a stroke, or a portion of a stroke, of the table and each vertex may correspond to an intersection of two or more edges. In other words, the edges are separated by the vertices. Further, an edge may contain a path of pixels from one end of the stroke to the other end of the stroke, located approximately at the center of the stroke. In one or more embodiments, the width of the path is 1 pixel. In one or more embodiments of the invention, the width of the path is multiple pixels.

In one or more embodiments of the invention, the table engine (110) may be implemented in hardware (i.e., circuitry), software, or any combination thereof. The table engine (110) is configured to detect the cells in the table. In other words, the table engine (110) is configured to identify the edges and vertices that form the cells of the table.

In one or more embodiments of the invention, the table engine (110) selects a corner vertex, a starting vertex, and an ending vertex. The table engine (110) will attempt to find a rectangular path or near rectangular path from the starting vertex to the ending vertex in a predetermined direction (e.g., clockwise, counterclockwise).

In one or more embodiments, the corner vertex is a vertex on the skeleton graph that represents an intersection of three or more edges. The starting vertex is separated from the corner vertex by a single edge. The ending vertex is separated from the corner vertex by a single edge. Moreover, the edges starting from the corner vertex and between the starting vertex and the ending vertex are selected such that the edge between the corner vertex and the starting vertex and the edge between the ending vertex and the corner vertex are perpendicular or approximately perpendicular. For example, the edge between the corner vertex and the starting vertex may be in the EAST direction in the custom coordinate system, while the edge between the ending vertex and the corner vertex may be in the NORTH direction in the custom coordinate system.

In one or more embodiments of the invention, the table engine (110) initializes a visited vertices (VV) data structure (e.g., array, linked list, etc.) and stores the corner vertex, the starting vertex, and the ending vertex in separate entries of the VV data structure. In one or more embodiments, the VV data structure is used to record all vertices that were selected as candidate vertices (including the corner vertex, the starting vertex, and the ending vertex) during the process to find a rectangular or near rectangular path between the starting vertex and the ending vertex (discussed below).

In one or more embodiments of the invention, table engine (110) initializes a route option (RO) data structure (e.g., array, linked list, etc.). The RO data structure is used to record all route options for a current vertex (discussed below). Each entry in the RO data structure includes: a vertex that is adjacent to the current vertex, a current travel vector, a new travel vector, and a turn cost. The current travel vector is a travel direction to the current vertex from the vertex preceding the current vertex. The new travel vector is the travel direction from the current vertex to the adjacent vertex. For example, assume that the corner vertex is selected as the current vertex and the clockwise direction is selected for the near rectangular cell detection process. The RO data structure created for the corner vertex would include one entry with the starting vertex as the vertex that is adjacent to the current vertex. The current travel vector is the direction of travel from the ending vertex to the corner vertex and the new travel vector is the direction of travel from the corner vertex to the starting vertex. This will be discussed in further detail below in reference to FIGS. 4A to 4C.

In one or more embodiments, the current travel vector is recorded in the format of (x, y), where the (x, y) is the coordinates of the current vertex for the edge between the previous vertex and the current vertex when the edge has been translated such that the previous vertex is at the origin of the custom coordinate system. Similarly, the new travel vector is recorded in the format (x, y), where (x, y) is the coordinates of the adjacent vertex for the edge between the current vertex and an adjacent vertex when the edge has been translated such that the current vertex is at the origin of the custom coordinate system.

In one or more embodiments, the table engine calculates the turn cost for each adjacent vertex in the RO data structure. The turn cost is based on the absolute difference between the angle of the new travel vector and the angle of a vector that is perpendicular to the current travel vector and in the next cardinal direction from the direction of the current travel vector. The angle of the perpendicular vector in the next cardinal direction represents the ideal turn direction for the current travel direction (e.g., if the travel direction of the current travel vector is EAST, the ideal turn direction would be 90 degrees to the SOUTH for a clockwise direction). For example, assume an adjacent vertex in the RO data structure has a current travel vector (i.e., current travel direction) of (124, −9) and a new travel vector (i.e., new travel direction) of (130, −6). The vector that is perpendicular to the current travel vector and in the next cardinal direction is (9,124) and has an angle of 86 degrees. The angle of the new travel vector (130, −6) is calculated as −3 degrees. The absolute difference between 86 degrees and −3 degrees is 89 degrees, which is set as the turn cost of the vertex.

In one or more embodiments of the invention, the cameFrom data structure records all of the vertices that were explored (i.e., identified) or selected during the cell detection process and each vertex's preceding vertex. For example, the corner vertex, the ending vertex, the starting vertex, and all of the vertices in the set of route options recorded in the RO data structure are populated in the entries of the cameFrom data structure. Because the ending vertex is directly connected to the corner vertex in a counter clockwise direction of the table, the ending vertex is set as the vertex preceding the corner vertex in the entry for the corner vertex in the cameFrom data structure. In one or more embodiments of the invention, the preceding vertex of the ending vertex is set as the ending vertex itself.

In one or more embodiments of the invention, during the process attempting to find a near rectangular route from the starting vertex to the ending vertex, the table engine (110) selects an adjacent vertex from the set of route options stored in the RO data structure with the lowest turn cost. The table engine (110) confirms the candidate vertex has not yet been recorded in the VV data structure. The table engine (110) further determines, for the candidate vertex, if either: (i) the current travel direction matches the new travel direction; or (ii) the new travel direction is in the next clockwise cardinal direction with respect to the current travel direction. If the table engine (110) determines that the candidate vertex meets both of the above conditions, the table engine (110) stores the candidate vertex in the VV data structure and sets the candidate vertex as the current vertex. Otherwise, the table engine (110) will discard the selected candidate vertex, select the vertex among the remaining vertices in the set of route options with the lowest turn cost as a new candidate vertex, and repeat the above determinations until a candidate vertex that meet both conditions is selected.

For example, assume that the candidate vertex does not match a vertex in the VV data structure (i.e., the candidate vertex is absent from the VV data structure) has a current travel direction of EAST, and a new travel direction of EAST or SOUTH. As a result, this candidate vertex is stored in the VV data structure and set as the current vertex. In another example, assume that the candidate vertex does not match a vertex in the VV data structure (i.e., the candidate vertex is absent from the VV data structure), has a current travel direction of EAST, and has a new travel direction of NORTH. This candidate vertex is discarded and a new candidate vertex is selected because the new travel direction must be EAST or SOUTH. In yet another example, assume that the vertex among the vertices in the route options with the lowest turn cost matches a vertex in the VV data structure and has a current travel direction of EAST and a new travel direction EAST or SOUTH, this candidate vertex is discarded because it is already present in the VV data structure, and a new candidate vertex is selected.

In one or more embodiments of the invention, the table engine (110) determines if any of the edges (i.e., route options) between the current vertex and each of the adjacent vertices in the set of route options stored in the RO data structure are shorter than a minimum threshold length value. The minimum threshold length value may be computed as twice the average width, in pixels, of all strokes in the table. In one or more embodiments, in the event that the table engine (110) determines that one of the route options among the set of route options has a length that is shorter than a minimum threshold length value, the table engine (110) sets the new travel vector for the route option to be equal to the current travel vector of the route option. The table engine (110) further sets the turn cost for the route option to 0 (i.e., no calculation required, turn cost immediately set to 0), which allows noise generated by edges in the skeleton graph that do not meet the minimum threshold length value to be ignored.

In one or more embodiments, in the event that the table engine (110) selects a route option with a new travel direction that matches the current travel direction, the table engine (110) will keep the remaining route options in the RO data structure to be used for the next vertex designated as the current vertex. This will be discussed below in reference to FIGS. 4C and 4D.

In one or more embodiments, in the event that the table engine (110) selects a route option among the set of route options with a travel direction that changes the orientation of the current travel direction in the next clockwise or counter clockwise direction, the table engine (110) moves the remaining set of route options in the RO data structure to a turn history (TH) data structure.

In one or more embodiments, the TH data structure is a stack holdings sets of route options. Accordingly, in such embodiments, the last route options set added to the TH data structure is the first route options set to be retrieved from the TH data structure. The route options stored in the TH data structure may be accessed by the table engine (110) at any time when the table engine (110) determines that the current vertex is a dead end (i.e., the current vertex has no possible route options). This will be discussed in further detail below in reference to FIGS. 5A to 5C.

In one or more embodiments of the invention, in the event that the table engine (110) determines that an adjacent vertex among the set of route options for the current vertex is the ending vertex, the table engine (110) will automatically select the ending vertex as the candidate vertex and determine that a near rectangular route has been found. The table engine (110) generates a route for a cell in the table that includes one or more of the vertices stored in the VV data structure. The table engine (110) further walks backward through the generated route starting from the current vertex, eventually reaching the starting vertex, then the corner vertex, and ending at the ending vertex using the data stored in the cameFrom data structure.

In one or more embodiments, the table engine (110) repeats the above process for detecting rectangular or near rectangular cells for each of the corner vertices identified on the skeleton graph.

Although the system (100) is shown as having three components (104, 108, 110), in other embodiments of the invention, the system (100) may have more or fewer components. Further, the functionality of each component described above may be split across components. Further still, each component (104, 108, 110) may be utilized multiple times to carry out an iterative operation.

Figure 2A:
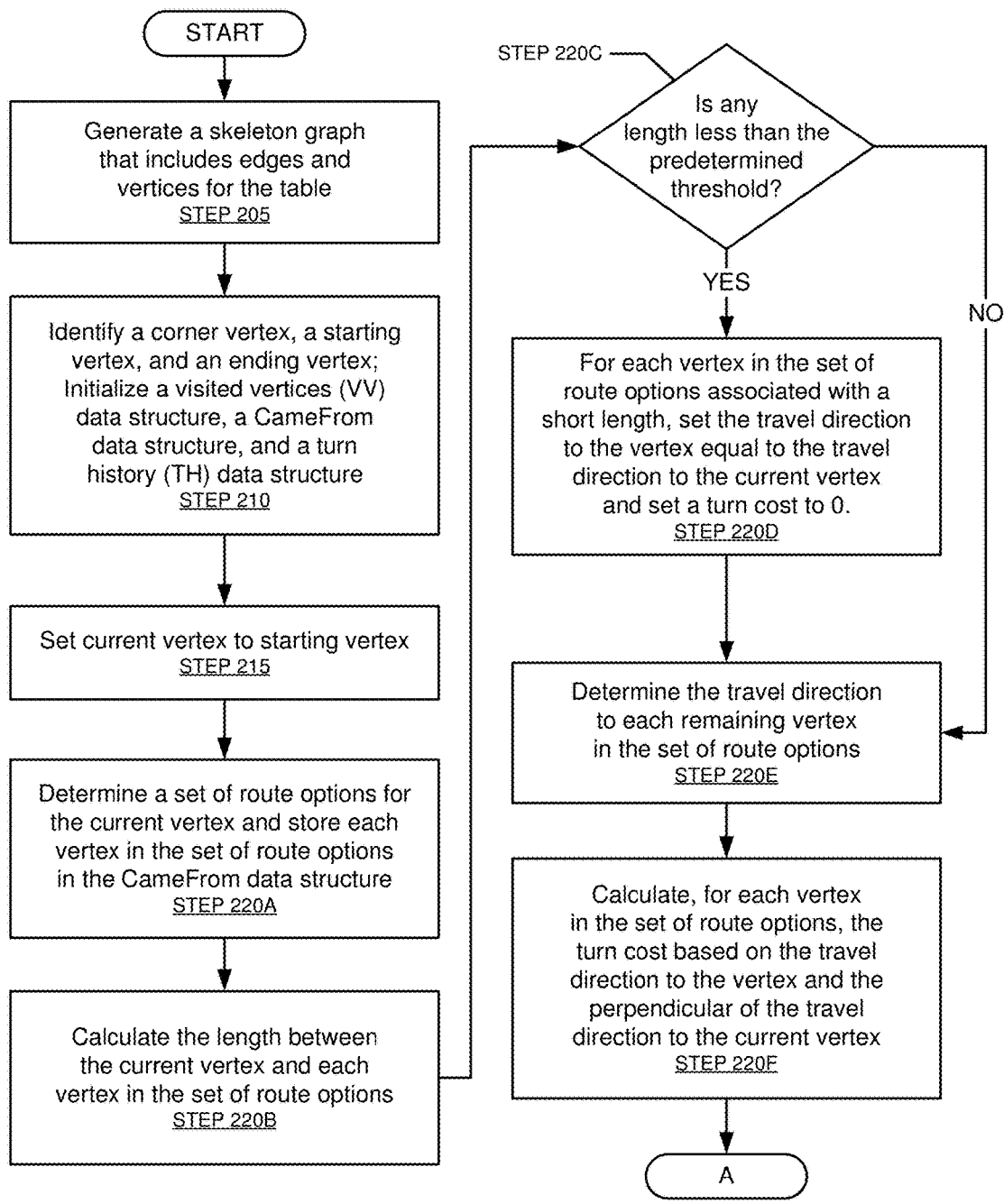
FIGS. 2A-2C show a flowchart in accordance with one or more embodiments of the invention.
Figure 2B:
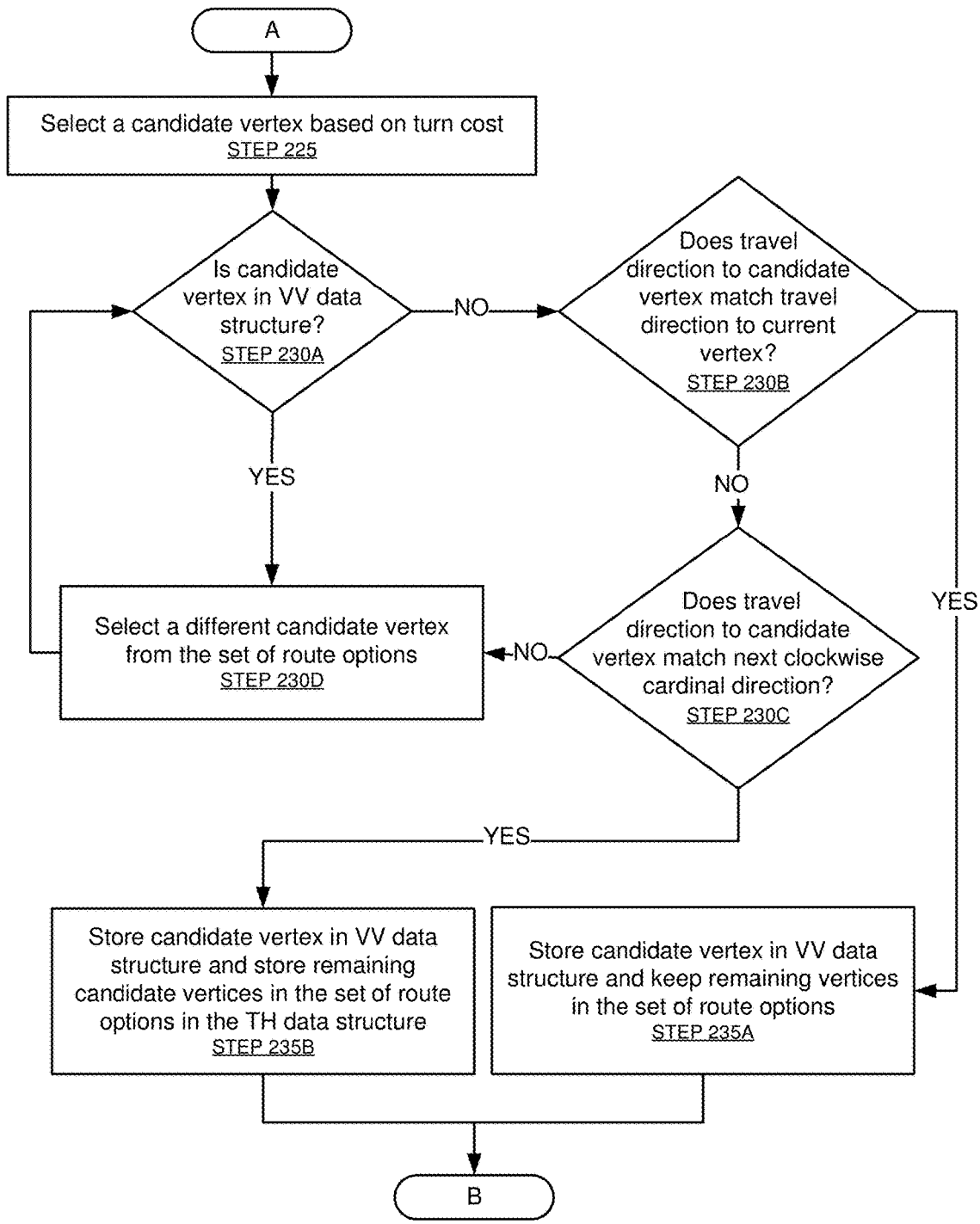
Figure 2C:
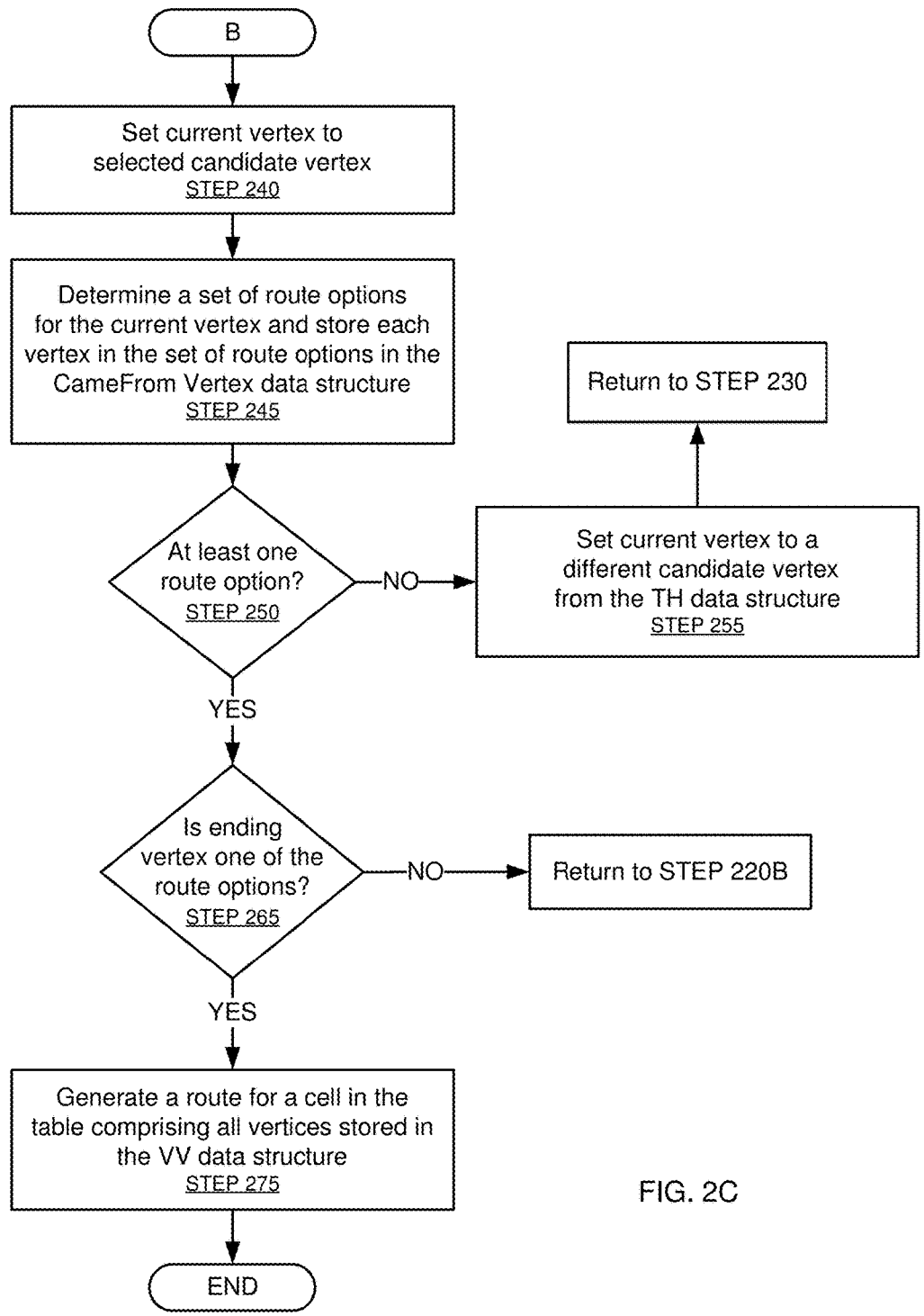

FIGS. 2A-2C show a flowchart in accordance with one or more embodiments of the invention. The flowchart depicts a process for image processing. Specifically, the flowchart depicts a process for detecting cells in an image of a table. One or more of the steps in FIGS. 2A-2C may be performed by the components of the system (100), discussed above in reference to FIG. 1. In one or more embodiments of the invention, one or more of the steps shown in FIG. 2A-2C may be omitted, repeated, and/or performed in a different order than the order shown in FIG. 2A-2C. Accordingly, the scope of the invention should not be considered limited to the specific arrangement of steps shown in FIG. 2A-2C.

In one or more embodiments of the invention, one or more of the steps shown in FIG. 2 are described based on the initial selection of the clockwise direction of the table with respect to a custom coordinate system. In one or more embodiments, the steps shown in FIG. 2 may be repeated for the counter clockwise direction.

Referring to FIG. 2A, initially, an image including a table is obtained and a skeleton graph is generated for the table (STEP 205). The image may be obtained (e.g., downloaded, scanned, etc.) from any source and may be of any size or format. For example, the image may include a writing board and the table is hand-drawn on the writing board. Additionally or alternatively, the image may be a scan of a hardcopy document, where the table is visible in the hardcopy document and the table was computer-generated. Due to the nature of strokes drawn by hand and/or errors introduced during the scanning process, the rows and columns of the table are unlikely to be bounded by perfectly straight strokes.

In one or more embodiments of the invention, the image is converted into a mask (e.g., a binary image) to identify each stroke of the table and/or text characters in the table. Pixels corresponding to the strokes of the table may be set to 1, while all remaining pixels are set to 0. Further, the custom coordinate system, as described above in reference to FIG. 1, is established for the table. Alternatively, the image may be rotated to better align the rows and columns of the table with the standard coordinate system of the image.

In one or more embodiments of the invention, as described above in reference to FIG. 1, the skeleton graph may include sets of edges and vertices that represent the table. Each edge may correspond to a stroke, or a portion of a stroke, of the table and each vertex may correspond to an intersection of two or more edges. In other words, the vertices separate edges.

In STEP 210, a corner vertex, a starting vertex, and an ending vertex, as discussed above in reference to FIG. 1, are identified on the skeleton graph. Furthermore, a visited vertices (VV) data structure, a cameFrom data structure, and a turn history (TH) data structure (discussed below in STEP 235B), as discussed above in reference to FIG. 1, are initialized. In one or more embodiments of the invention, the corner vertex, the starting vertex, and the ending vertex are stored in the VV data structure.

In one or more embodiments, the corner vertex is a vertex on the skeleton graph that represents an intersection of three or more edges. The starting vertex is separated from the corner vertex by a single edge. The ending vertex is separated from the corner vertex by a single edge. Moreover, the edges starting from the corner vertex and between the starting vertex and the ending vertex are selected such that the edge between the corner vertex and the starting vertex and the edge between the ending vertex and the corner vertex are perpendicular or approximately perpendicular.

For example, the edge between the corner vertex and the starting vertex may be in the EAST direction in the custom coordinate system, while the edge between the ending vertex and the corner vertex may be in the NORTH direction in the custom coordinate system.

In one or more embodiments, the VV data structure is used to record all vertices that were selected as candidate vertices (including the corner vertex, the starting vertex, and the ending vertex) during the process to find a rectangular or near rectangular path between the starting vertex and the ending vertex.

In one or more embodiments of the invention, the cameFrom data structure records all of the vertices that were explored (i.e., identified) or selected during the cell detection process and each vertex's preceding vertex. For example, the corner vertex, the ending vertex, and the starting vertex, are populated in the entries of the cameFrom data structure. Because the ending vertex is directly connected to the corner vertex in a counter clockwise direction of the table, the ending vertex is set as the vertex preceding the corner vertex in the entry for the corner vertex in the cameFrom data structure. In one or more embodiments of the invention, the preceding vertex of the ending vertex is set as the ending vertex itself.

In STEP 215, the starting vertex is set to the current vertex.

In STEP 220A, a set of route options (i.e., a set of adjacent vertices) are determined for the current vertex. Each adjacent vertex is separated from the current vertex by a single edge. In one or more embodiments, each adjacent vertex is stored in the cameFrom data structure.

In one or more embodiments, a route options (RO) data structure is initialized to store the set of route options determined for the current vertex. Each entry in the RO data structure includes: one of the adjacent vertices, a current travel vector, a new travel vector, and a turn cost (discussed below). The current travel vector is a travel direction to the current vertex from the vertex preceding the current vertex. The new travel vector is the travel direction from the current vertex to the adjacent vertex. For example, assume that the corner vertex is selected as the current vertex. The RO data structure created for the corner vertex would include one entry with the starting vertex as the vertex that is adjacent to the current vertex. The current travel vector is the direction of travel from the ending vertex to the corner vertex and the new travel vector is the direction of travel from the corner vertex to the starting vertex. This will be discussed in further detail below in reference to FIGS. 4A to 4C.

In STEP 220B, the length of each edge (i.e., route) between the current vertex and the adjacent vertices is calculated. In one or more embodiments of the invention, the length of an edge may be calculated as the Euclidean distance between the two terminal ends of the edge. Additionally or alternatively, the length may also be identified by counting the number of pixels within the edge's path of pixels.

In STEP 220C, a determination is made to determine whether there are any edges (i.e., routes) in the set of route options with a length under a predetermined threshold (i.e., a minimum threshold length value). In one or more embodiments, the minimum threshold length value may be computed as twice the average width, in pixels, of all strokes in the table.

In one or more embodiments of the invention, in the event that one of the route options among the set of route options has a length that is shorter than a minimum threshold length value, the new travel vector for the route option is set to be equal to the current travel vector of the route option. Further, the turn cost for the route option is set to 0 (i.e., no calculation required, turn cost is immediately set to 0), which allows noise generated by edges in the skeleton graph that do not meet the minimum threshold length value to be ignored.

When it is determined that one or more adjacent vertices are separated from the current vertex by an edge having a length less than the minimum length threshold (i.e., STEP 220C evaluates to YES), the process proceeds to STEP 220D. In STEP 220D, for each vertex associated with an edge (i.e., route) with a short length, the new travel vector (i.e., the travel direction from the current vertex to the adjacent vertex in the set of route options) is set to be equal to the current travel vector (i.e., the travel direction from the vertex preceding the current vertex on the skeleton graph to the current vertex). Then, the process proceeds to STEP 220E.

In one or more embodiments, the current travel vector is recorded in the format of (x, y), where the (x, y) is the coordinates of the current vertex for the edge between the previous vertex and the current vertex when the edge has been translated such that the previous vertex is at the origin of the custom coordinate system. Similarly, the new travel vector is recorded in the format (x, y), where (x, y) is the coordinates of the adjacent vertex for the edge between the current vertex and an adjacent vertex when the edge has been translated such that the current vertex is at the origin of the custom coordinate system.

When it is determined that all of the adjacent vertices are separated from the current vertex by an edge having a length equaling or exceeding the minimum length threshold (i.e., STEP 220D evaluates to NO), the process proceeds directly to STEP 220E.

In STEP 220E, a new travel vector (i.e., the travel direction from the current vertex to the adjacent vertex in the set of route options) is determined for each vertex in the remaining set of route options (i.e., the adjacent vertices that are separated from the current vertex by an edge equaling or in excess of the minimum length threshold).

In STEP 220F, a turn cost, as discussed above in reference to FIG. 1, is calculated for each vertex in the set of route options.

In one or more embodiments of the invention, the turn cost is based on the absolute difference between the angle of the new travel vector and the angle of a vector that is perpendicular to the current travel vector and in the next cardinal direction from the direction of the current travel vector. The angle of the perpendicular vector in the next cardinal direction represents the ideal turn direction for the current travel direction (e.g., if the travel direction of the current travel vector is EAST, the ideal turn direction would be 90 degrees to the SOUTH for a clockwise direction). For example, assume an adjacent vertex has a current travel vector (i.e., current travel direction) of (124, −9) and a new travel vector (i.e., new travel direction) of (130, −6). The vector that is perpendicular to the current travel vector and in the next cardinal direction is (9,124) and has an angle of 86 degrees. The angle of the new travel vector (130, −6) is calculated as −3 degrees. The absolute difference between 86 degrees and −3 degrees is 89 degrees, which is set as the turn cost of the vertex.

In one or more embodiments, the turn cost for a route option with a length that is shorter than a minimum threshold length value is set to 0 (i.e., no calculation required, turn cost immediately set to 0).

In STEP 225, the vertex in the set of route options with the lowest turn cost is selected as a candidate vertex.

In STEP 230A, a determination is made to determine whether the candidate vertex selected in STEP 225 matches a vertex stored in the VV data structure. In other words, it is determined whether the candidate vertex is already recorded in the VV data structure. When it is determined that the candidate vertex is already recorded in the VV data structure, the process proceeds to STEP 230D. Otherwise, when it is determined that the candidate vertex is absent from the VV data structure, the process proceeds to STEP 230B.

In STEP 230D, a new (i.e., different) candidate vertex is selected from the remaining vertices in the set of route options. In one or more embodiments of the invention, the new candidate vertex is the vertex among the remaining vertices in the set of route options with the lowest turn cost. In one or more embodiments of the invention, the first candidate vertex selected in STEP 225 is discarded from the set of route options.

In STEP 230B, it is determined whether the new travel direction of the candidate vertex (i.e., the travel direction from the current vertex to the candidate vertex) matches the current travel direction of the candidate vertex (i.e., the travel direction from the vertex preceding the current vertex on the skeleton graph to the current vertex) (e.g., they are both EAST). When it is determined that the new travel direction matches the current travel direction, the process proceeds to STEP 235A. When it is determined that the new travel direction does not match the current travel direction, the process proceeds to STEP 230C.

In STEP 230C, it is determined whether the new travel direction of the candidate vertex (i.e., the travel direction from the current vertex to the candidate vertex) matches the next clockwise cardinal direction of the current travel direction. For example, if the current travel direction is EAST, it is determined whether the new travel direction is SOUTH. As another example, if the current travel direction is NORTH, it is determined whether the next travel direction is EAST. When it is determined that the new travel direction matches the next clockwise cardinal direction of the current travel direction, the process proceeds to STEP 235B. Otherwise, the process proceeds to STEP 230D.

In STEP 235A, the selected candidate vertex is stored in the VV data structure and the remaining vertices in the set of route options are kept in the RO data structure for the next current vertex. This will be discussed below in reference to FIGS. 4C and 4D.

In STEP 235B, the selected candidate vertex is stored in the VV data structure and the remaining vertices in the set of route options are moved to the TH data structure. This will be discussed in more detail below in reference to FIGS. 5A to 5C.

In one or more embodiments of the invention, the TH data structure is a stack holding sets of route options. The set of remaining route options that were not selected are pushed onto the TH data structure. The stack of route options stored in the TH data structure may be accessed when the current vertex is determined to be a dead end (i.e., the current vertex has no possible route options) (discussed below in STEP 250).

In STEP 240, the candidate vertex is designated as the new current vertex. In STEP 245, a set of route options (i.e., adjacent vertices) as discussed above in reference to FIG. 1 and STEP 220A, is determined for the new current vertex and each of the adjacent vertices in the set of route options for the new current vertex is stored in the cameFrom vertex data structure.

In STEP 250, a determination is made to determine if the set of route options for the new current vertex includes at least one route option. In the event that the determination in STEP 250 is NO, the process proceeds to STEP 255 where the top-most set of route options is popped from the TH data structure and a new (i.e., different) candidate vertex is selected from the set. In one or more embodiments of the invention, the new (i.e., different) candidate vertex selected is the vertex with the lowest turn cost among the route options stored in the set. Once a new (i.e., different) candidate vertex is selected, the process returns to STEP 230. In one or more embodiments, the current vertex without any route options is removed from the VV data structure.

In the event that the determination in STEP 250 is YES (i.e., at least one route option exists for the current vertex), the process proceeds to STEP 265 where a determination is made to determine whether the route options (i.e., adjacent vertices) of the new current vertex includes the ending vertex.

In the event that the determination in STEP 265 is NO, the process returns to STEP 220B where the above described steps are repeated for the new current vertex.

In the event that the determination in STEP 265 is YES, the process proceeds to STEP 275 where a route is generated for a cell in the table. In one or more embodiments, the generated route includes all vertices stored in the VV data structure. In one or more embodiments, the data stored in the cameFrom data structure is used to backtrack (i.e., walk backward through) the generated route starting from the current vertex, eventually reaching the starting vertex, then the corner vertex, and ending at the ending vertex.

Figure 3A:
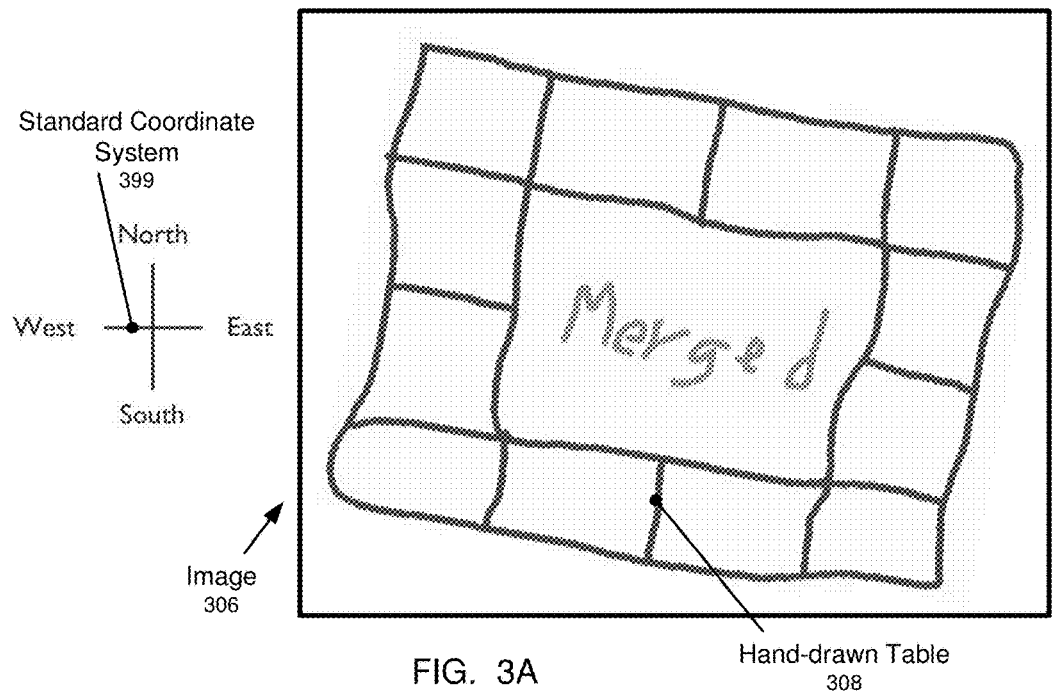
Figure 3B:
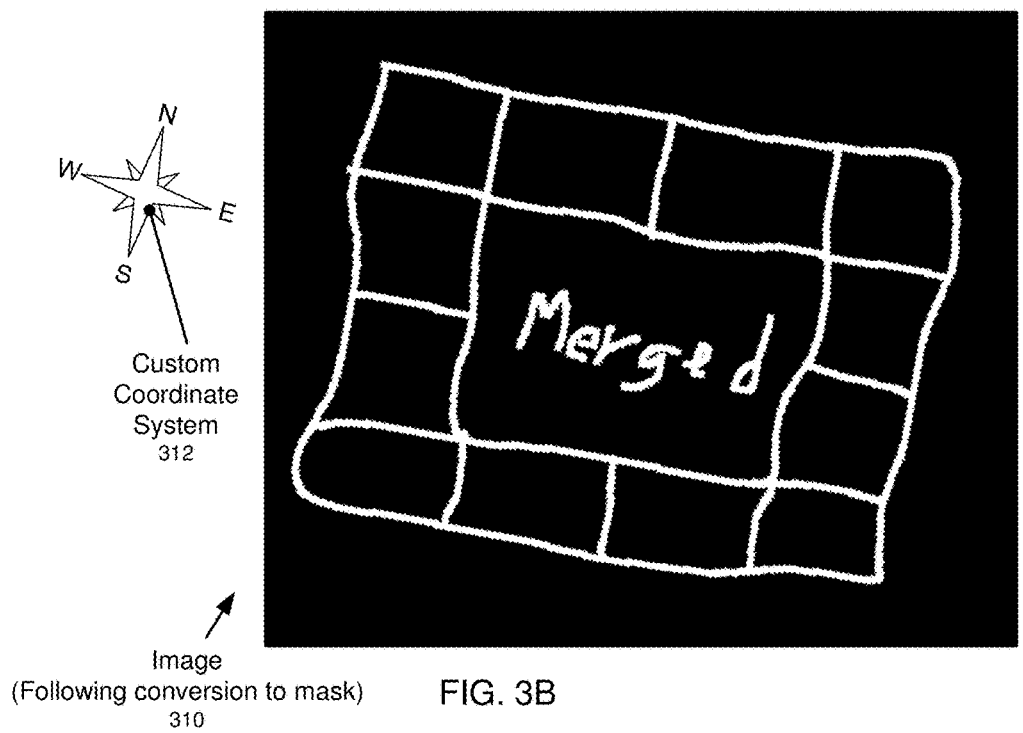

FIGS. 3A-3C show an implementation example in accordance with one or more embodiments of the invention. FIG. 3A shows an image (306) with a hand-drawn table (308). Specifically, the table (308) includes hand-drawn stokes that form the rows and columns. One or more cells of the table (308) may include text. Alternatively, one or more of the cells of the table may be merged. The hand-drawn table (308) may be drawn at an angle. In other words, the table (308) is not aligned with the standard coordinate system (399) for the image (306).

FIG. 3B shows the image (310) after it has been converted to a mask. Moreover, a custom coordinate system (312) has been established. This custom coordinate system (312) has axes that are better aligned with the rows and columns of the table (308) than the standard coordinate system (399).

FIG. 3C shows a partial skeleton graph (314) for the table. As shown in FIG. 3C, the rows and columns of the table are formed by multiple hand-drawn strokes (316). The skeleton graph (314) includes a set of edges (395) and vertices that represent the hand-drawn table. Each edge (395) corresponds to a stroke (316), or a portion of a stroke, of the hand-drawn table and each vertex may correspond to an intersection (318) of two or more edges (395). In other words, the edges (395) are separated by the vertices. Further, each edge (395) contains a path of pixels from one end of the stroke (316) to the other end of the stroke (316), located approximately at the center of the stroke. In FIG. 3C, the width of the path/edge is 1 pixel.

FIGS. 4A-4H show an implementation example in accordance with one or more embodiments of the invention.

Figure 4A:
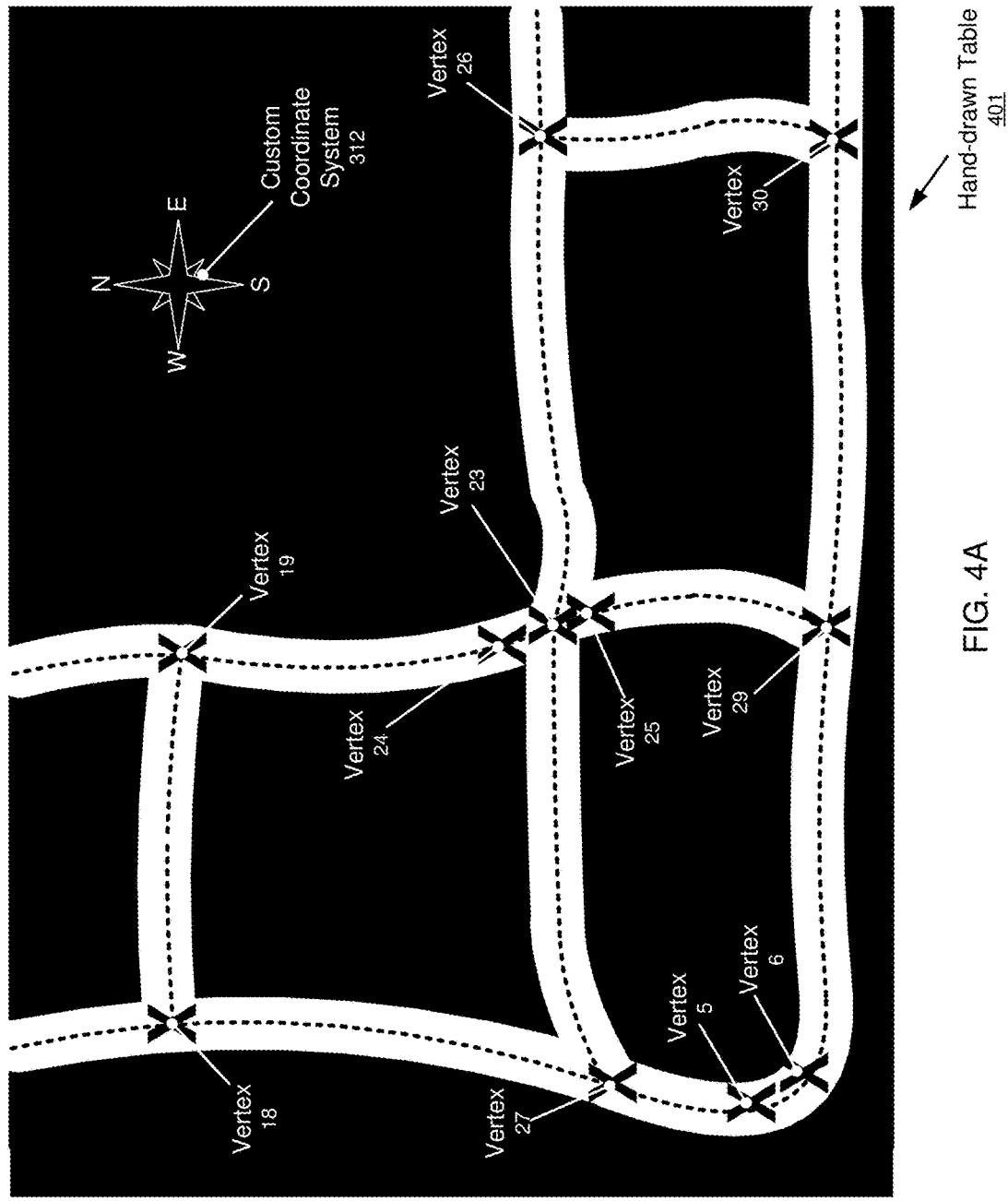

FIG. 4A shows a partial mask and skeleton graph of a hand-drawn table (401) similar to the image (310) and skeleton graph (314) of hand-drawn table (308), as discussed above in reference to FIGS. 3A-3C. The custom coordinate system (312), as discussed in reference to FIGS. 3A-3C, has been established for the hand-drawn table (401). As seen in FIG. 4A, the skeleton graph of the hand-drawn table (401) includes multiple vertices (5, 6, 18, 19, 23, 24, 25, 26, 27, 29, 30). Assume vertex (27) is selected as the corner vertex. Accordingly, vertex (23) is the starting vertex and vertex (5) is the ending vertex. Each of the starting vertex (i.e., vertex (23)) and the ending vertex (i.e., vertex (5)) is separated from the corner vertex (i.e., vertex (27)) by a single edge. Moreover, the direction of the edge from vertex (27) to vertex (23) is EAST, while the direction of the edge from vertex (5) to vertex (27) is NORTH (i.e., the two edges are perpendicular or approximately perpendicular). This is an example of STEP 210 discussed above.

FIG. 4B shows an example of an initialized visited vertices (VV) data structure (403) where vertex (27), as shown in FIG. 4A, is selected as the corner vertex. The direction of the near rectangular cell detection process is set to clockwise, which results in vertex (23) being selected as the starting vertex and vertex (5) being selected as the ending vertex. This is an example of STEP 210 discussed above.

FIG. 4C shows an example of an initialized route option (RO) data structure (405A) that includes a set of route options determined for the corner vertex (27). As seen in FIG. 4C, the only route option available for the corner vertex (27) is the starting vertex (23). The current travel vector is the direction of travel from the ending vertex (5) to the corner vertex (27) and the new travel vector is the direction of travel from the corner vertex (27) to the starting vertex (23). Because only one route option is available for the starting vertex (23) (i.e., the starting vertex (23) is guaranteed to be selected), the turn cost is initialized to 0.

FIG. 4D shows an example of a RO data structure (405B) for the starting vertex (23) once the starting vertex has been set as the current vertex. As seen in FIG. 4A, all of the vertices (25, 26, 24) in the RO data structure (405B) are adjacent to the starting vertex (23). The current travel vector of each vertex in the set of route options is the direction of travel from the corner vertex (27) to the starting vertex (23) and the new travel vector of each vertex in the set of route options is the direction of travel from the starting vertex (23) to each adjacent vertex.

It is determined that the edge between the starting vertex (23) and the vertex (25) has a length that is less than a predetermined threshold. Accordingly, as seen in the RO data structure (405B) of FIG. 4D, the new travel direction of vertex (25) is set to equal the current travel direction and the turn cost is set to 0. This is an example of STEPS 220C and 220D above.

As further seen in the RO data structure (405B) of FIG. 4D, the route option for vertex (25) has been set to 0 (i.e., no turn cost calculation is required, turn cost immediately set to 0) to guarantee it has the lowest turn cost. Therefore, the route option for vertex (25) is selected as the candidate vertex to be explored. Because the vertex (25) does not match the vertices (5, 23, 27) stored in the VV data structure (403) of FIG. 4B, and because the travel direction of the new travel vector matches the travel direction of the current travel vector, vertex (25) will be chosen as the candidate vertex to be stored in the VV data structure (403) of FIG. 4B and designated as the next current vertex. This is an example of STEPS 225 to 235A or 235B discussed above.

FIG. 4E shows an example of a RO data structure (405C) for vertex (25) once vertex (25) replaces the starting vertex (23) as the new current vertex. As seen in the RO data structure (405C) of FIG. 4E, because the travel direction of the route option with vertex (25) remained the same, the remaining vertices (24, 26) from the RO data structure (405B) of FIG. 4D are kept for the set of route options determined for vertex (25). This is an example of STEP 235A discussed above.

As further seen in the RO data structure (405C) shown in FIG. 4E, the route option for vertex (29) has the lowest turn cost (e.g., 7). Therefore, the route option for vertex (29) is selected as the candidate vertex to be explored. Because the vertex (29) does not match the vertices (5, 23, 27, 25) that are now stored in the VV data structure (403), and because the travel direction of the new travel vector matches the next clockwise direction with respect to the travel direction of the current travel vector (e.g., as seen in FIG. 4A, the travel direction from vertex (25) to vertex (29) is SOUTH, which is the next clockwise direction of the travel direction from vertex (23) to vertex (25) of EAST), vertex (29) will be chosen as the candidate vertex to be stored in the VV data structure (403) of FIG. 4B and designated as the next current vertex. This is an example of STEPS 225 to 235A or 235B discussed above.

FIG. 4F shows an example of a turn history (TH) data structure (407) initialized after the vertex (29) from the RO data structure (405C) of FIG. 4E has been selected as the next current vertex. As discussed above, because the selection of vertex (29) changes the orientation of the travel direction from EAST to SOUTH, the RO data structure (405C) with remaining vertices (24, 26) of FIG. 4E is pushed onto the TH data structure (407) of FIG. 4F. This is an example of STEP 235B discussed above.

FIG. 4G shows an example of the VV data structure (403) after being populated with all vertices that make up a route for a cell in the table for the examples discussed in FIGS. 4B-4F where the selected corner vertex is vertex (27). As seen in FIG. 4G, the vertex (6), which is the vertex adjacent to the ending vertex (5), is last vertex to be stored in the VV data structure (403).

FIG. 4H shows an example of a cameFrom (CF) data structure (409) that includes all of the vertices that were explored to generate a route for a cell in the table for the examples discussed in FIGS. 4B-4G where the selected corner vertex is vertex (27). As seen in FIG. 4H, all vertices from the RO data structures (405A, 405B, 405C) of FIGS. 4C-4E are stored as an entry. As further seen in FIG. 4H, each entry in the cameFrom (CF) data structure (409) includes a vertex and the vertex that directly precedes the vertex in a counter clockwise direction on the skeleton graph. Furthermore, the preceding vertex for vertex (5) is set as itself to indicate that vertex (5) is the ending vertex.

Figure 5A:
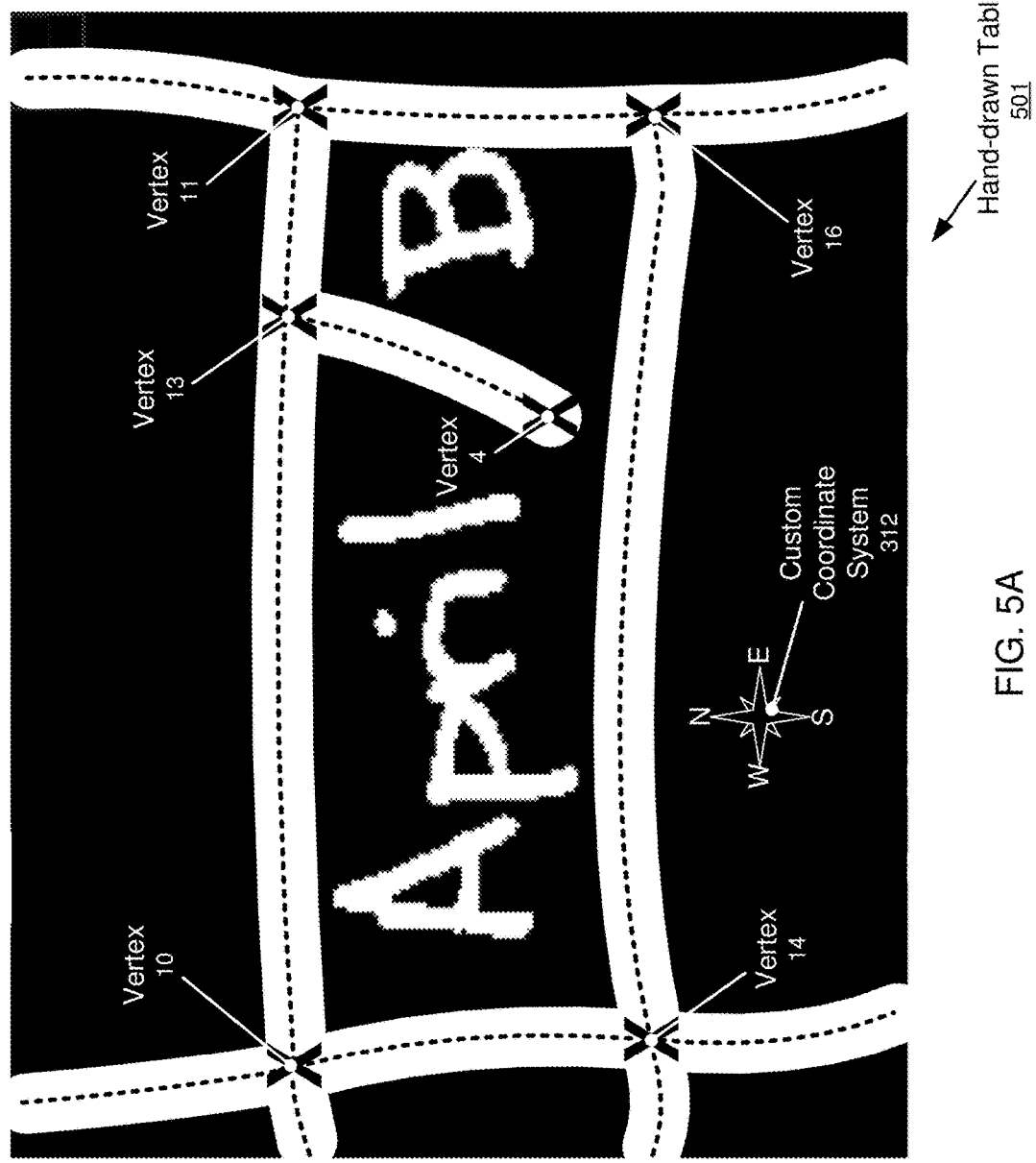

FIGS. 5A-5C show an implementation example in accordance with one or more embodiments of the invention.

FIG. 5A shows a partial mask and skeleton graph of a hand-drawn table (501) similar to the image (310) and skeleton graph (314) of hand-drawn table (308), as discussed above in reference to FIGS. 3A-3C. The custom coordinate system (312), as discussed in reference to FIGS. 3A-3C, has been established for the hand-drawn table (501). As seen in FIG. 5A, the skeleton graph of the hand-drawn table (501) includes multiple vertices (4, 10, 11, 13, 14, 16). As further seen in FIG. 5A, the vertex (4) is located at an end of a stroke without a connection to any of the other strokes in the skeleton graph. This stroke may be the result of imperfections created by the user when creating the hand-drawn table (501).

In the example shown in FIG. 5A, the vertex (10) is selected as the corner vertex, vertex (14) is selected as the ending vertex, and vertex (13) is selected as the starting vertex (13). These vertices (10, 13, 14) are stored in a visited vertices (VV) data structure (not illustrated) initialized for corner vertex (10).

FIG. 5B shows an example of a RO data structure (503) with the route options determined for starting vertex (13). As seen in FIG. 5B, vertex (4) is included as one of the route options for starting vertex (13). Furthermore, vertex (4) also has the lowest turn cost. Therefore, vertex (4) is selected as the first candidate vertex to be explored. Because vertex (4) does not match any of the vertices (10, 13, 14) in the VV data structure, and because the travel direction of the new travel vector of vertex (14) is SOUTH, which is the next clockwise cardinal direction with respect to the travel direction of the current travel vector of EAST, vertex (4) is selected to be stored in the VV data structure and designated as the new current vertex. This is an example of STEPS 225 to 235B discussed above.

FIG. 5C shows an example of a turn history (TH) data structure (507) that stores the RO data structure (503) with vertex (11) that was not selected as the candidate vertex shown in FIG. 5B. The route option data structure was pushed onto the TH data structure (507) because the selection of vertex (4) from the RO data structure (503) of FIG. 5B changed the orientation of the travel direction from EAST to SOUTH. This is an example of STEP 235B discussed above.

As seen in FIG. 5A, vertex (4) has no further connections with any other strokes (i.e., vertex (4) has no available route options). Once the near rectangular detection process determines that vertex (4) has no available route options, the process pops the topmost route options data structure from the TH data structure (507) and selects vertex (11) as the new (i.e., different) candidate vertex. Because vertex (11) does not match any of the visited vertices (4, 10, 13, 14) in the VV data structure, and because the travel direction of EAST for the new travel vector of vertex (11) matches the travel direction of EAST for the current travel vector of vertex (11), vertex (11) is stored in the VV data structure and replaces vertex (4) as the new current vertex. This is an example of STEPS 240 to 255 discussed above.

Figure 6:
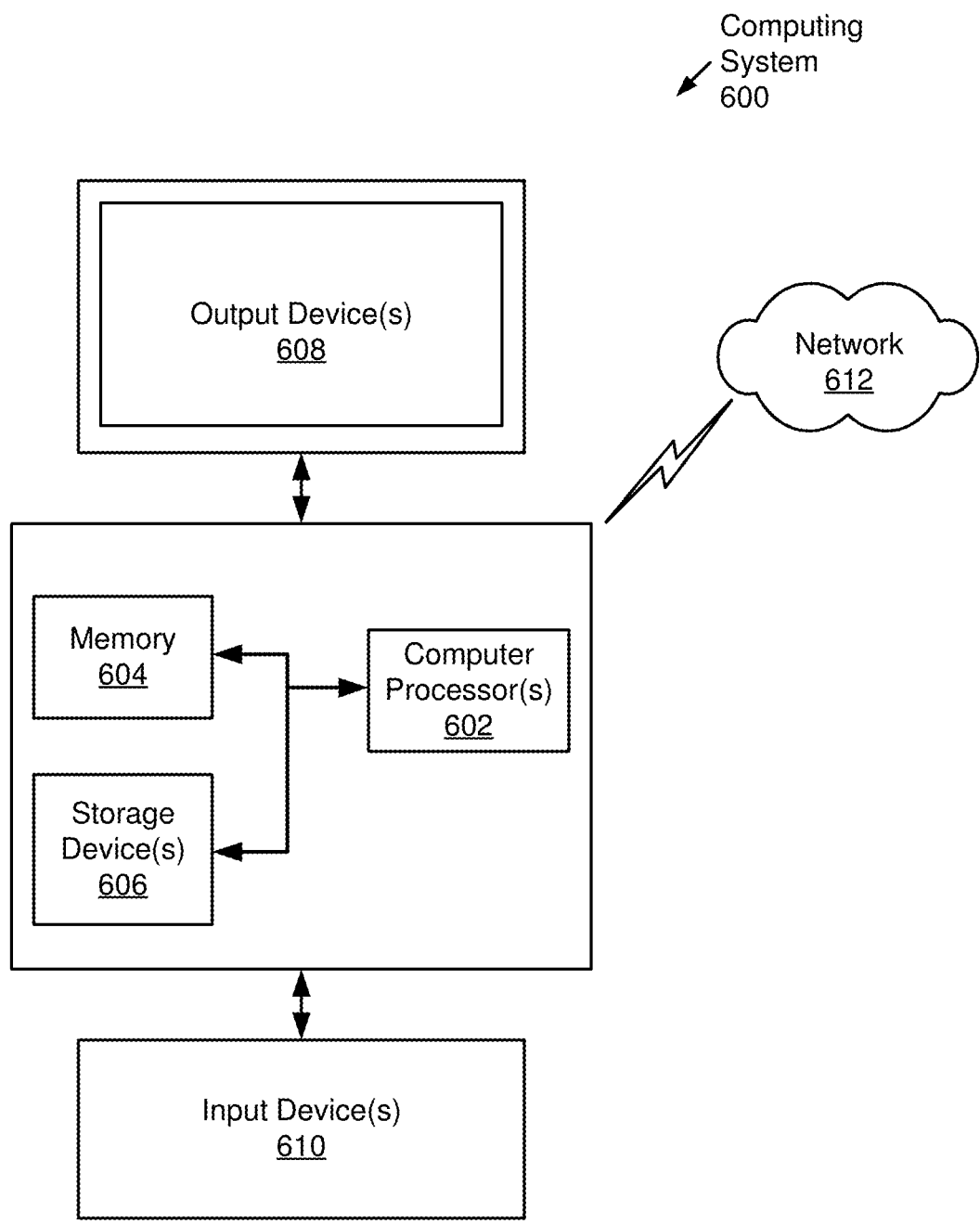
FIG. 6 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an image comprising a table, comprising:
   processing the image to generate a skeleton graph associated with the table in the image, wherein the skeleton graph comprises a plurality of edges;
   identifying, in the skeleton graph, a corner vertex, a starting vertex adjacent to the corner vertex, and an ending vertex adjacent to the corner vertex;
   calculating a travel direction from the corner vertex to the starting vertex;
   determining a set of route options for the starting vertex comprising:
     a first set of vertices adjacent to the starting vertex in the skeleton graph;
     a set of travel directions from the starting vertex to the first set of vertices; and
     a set of turn costs for the first set of vertices based on the set of travel directions and a perpendicular of the travel direction from the corner vertex to the starting vertex;
   selecting a candidate vertex from the first set of vertices as a first vertex based on the set of turn costs;
   determining a set of route options for a second vertex comprising a second set of vertices adjacent to the second vertex in the skeleton graph;
   determining the second set of vertices comprises the ending vertex; and
   identifying a cell of the table in the processed image by generating a route for the cell,
   wherein the route comprises the corner vertex, the starting vertex, the first vertex, the second vertex, and the ending vertex.

2. The method of claim 1, further comprising:
   calculating a length of an edge between the starting vertex and the first vertex of the first set of vertices;
   determining the length is less than a predetermined threshold; and
   setting, before selecting the first vertex, a travel direction from the starting vertex to the first vertex as the travel direction from the corner vertex to the starting vertex.

3. The method of claim 1, further comprising:
   determining a change in cardinal direction between the travel direction from the corner vertex to the starting vertex and a travel direction from the starting vertex to the candidate vertex;
   adding, in response to the change in cardinal direction, the set of route options for the starting vertex, excluding the candidate vertex, to a turn history (TH) data structure;
   determining the candidate vertex has no route options;
   retrieving, from the TH data structure and in response to the candidate vertex having no route options, the set of route options;
   selecting, in response to the candidate vertex having no route options, a replacement vertex from the set of route options as the first vertex based on the set of turn costs; and
   determining a set of route options for the replacement vertex.

4. The method of claim 3, wherein the candidate vertex has a lowest turn cost of the set of turn costs, and wherein the replacement vertex has a second lowest turn cost of the set of turn costs.

5. The method of claim 3, wherein the travel direction from the corner vertex to the starting vertex is EAST, and wherein the travel direction from the starting vertex to the candidate vertex is SOUTH.

6. The method of claim 1, further comprising:
   adding the ending vertex, the corner vertex, and the starting vertex to a visited vertices (VV) data structure;
   adding the candidate vertex to the VV data structure in response to the candidate vertex being absent from the VV data structure and at least one selected from a group consisting of:
     a travel direction from the corner vertex to the starting vertex matching a travel direction from the starting vertex to the candidate vertex; and
     a clockwise change in cardinal direction between the travel direction from the corner vertex to the starting vertex and the travel direction from the starting vertex to the candidate vertex.

7. The method of claim 1, further comprising:
   populating a cameFrom data structure with the ending vertex, the corner vertex, the starting vertex, the set of vertices adjacent the starting vertex, the second vertex, and the set of vertices adjacent to the second vertex; and
   populating, for each entry in the cameFrom data structure, a preceding vertex.

8. The method of claim 7, wherein generating the route comprises tracing vertices in the cameFrom data structure starting at the second vertex and ending at the ending vertex.

9. The method of claim 1, wherein the image comprises a writing board, and the table is hand-drawn on the writing board with a marker.

10. A non-transitory computer readable medium (CRM) storing computer readable program code embodied therein that:
processes an image comprising a table to generate a skeleton graph associated with the table in the image, wherein the skeleton graph comprise a plurality of edges;
identifies, in the skeleton graph, a corner vertex, a starting vertex adjacent to the corner vertex, and an ending vertex adjacent to the corner vertex;
calculates a travel direction from the corner vertex to the starting vertex;
determines a set of route options for the starting vertex comprising:
a first set of vertices adjacent to the starting vertex in the skeleton graph;
a set of travel directions from the starting vertex to the first set of vertices; and
a set of turn costs for the first set of vertices based on the set of travel directions and a perpendicular of the travel direction from the corner vertex to the starting vertex;
selects a candidate vertex from the first set of vertices as a first vertex based on the set of turn costs;
determines a set of route options for a second vertex comprising a second set of vertices adjacent to the second vertex in the skeleton graph;
determines the second set of vertices comprises the ending vertex; and
identifies a cell of the table in the processed image by generating a route for the cell,
wherein the route comprises the corner vertex, the starting vertex, the first vertex, the second vertex, and the ending vertex.

11. The non-transitory CRM of claim 10, further storing computer readable program code embodied therein that:
calculates a length of an edge between the starting vertex and the first vertex of the first set of vertices;
determines the length is less than a predetermined threshold; and
sets, before selecting the first vertex, a travel direction from the starting vertex to the first vertex as the travel direction from the corner vertex to the starting vertex.

12. The non-transitory CRM of claim 10, further storing computer readable program code embodied therein that:
determines a change in cardinal direction between the travel direction from the corner vertex to the starting vertex and a travel direction from the starting vertex to the candidate vertex;
adds, in response to the change in cardinal direction, the set of route options for the starting vertex, excluding the candidate vertex, to a turn history (TH) data structure;
determines the candidate vertex has no route options;
retrieves, from the TH data structure and in response to the candidate vertex having no route options, the set of route options;
selects, in response to the candidate vertex having no route options, a replacement vertex from the set of route options as the first vertex based on the set of turn costs; and
determines a set of route options for the replacement vertex.

13. The non-transitory CRM of claim 12, wherein
the candidate vertex has a lowest turn cost of the set of turn costs, and wherein the replacement vertex has a second lowest turn cost of the set of turn costs, and
the travel direction from the corner vertex to the starting vertex is EAST, and wherein the travel direction from the starting vertex to the candidate vertex is SOUTH.

14. The non-transitory CRM of claim 10, wherein the image comprises a writing board, and wherein the table is hand-drawn on the writing board with a marker.

15. A system for image processing, comprising:
a memory;
a computer processor connected to the memory that:
processes an image comprising a table to generate a skeleton graph associated with the table in the image, wherein the skeleton graph comprise a plurality of edges;
identifies, in the skeleton graph, a corner vertex, a starting vertex adjacent to the corner vertex, and an ending vertex adjacent to the corner vertex;
calculates a travel direction from the corner vertex to the starting vertex;
determines a set of route options for the starting vertex comprising:
a first set of vertices adjacent to the starting vertex in the skeleton graph;
a set of travel directions from the starting vertex to the first set of vertices; and
a set of turn costs for the first set of vertices based on the set of travel directions and a perpendicular of the travel direction from the corner vertex to the starting vertex;
selects a candidate vertex from the first set of vertices as a first vertex based on the set of turn costs;
determines a set of route options for a second vertex comprising a second set of vertices adjacent to the second vertex in the skeleton graph;
determines the second set of vertices comprises the ending vertex; and
identifies a cell of the table in the processed image by generating a route for the cell,
wherein the route comprises the corner vertex, the starting vertex, the first vertex, the second vertex, and the ending vertex.

16. The system of claim 15, wherein the processor also:
calculates a length of an edge between the starting vertex and the first vertex of the first set of vertices;
determines the length is less than a predetermined threshold; and
sets, before selecting the first vertex, a travel direction from the starting vertex to the first vertex as the travel direction from the corner vertex to the starting vertex.

17. The system of claim 15, wherein the processor also:
determines a change in cardinal direction between the travel direction from the corner vertex to the starting vertex and a travel direction from the starting vertex to the candidate vertex;
adds, in response to the change in cardinal direction, the set of route options for the starting vertex, excluding the candidate vertex, to a turn history (TH) data structure;
determines the candidate vertex has no route options;
retrieves, from the TH data structure and in response to the candidate vertex having no route options, the set of route options selects, in response to the candidate vertex having no route options, a replacement vertex from the first set of vertices the set of route options as the first vertex based on the set of turn costs; and determines a set of route options for the replacement vertex.

18. The system of claim 17, wherein the candidate vertex has a lowest turn cost of the set of turn costs, and wherein the replacement vertex has a second lowest turn cost of the set of turn costs.

19. The system of claim 17, wherein the travel direction from the corner vertex to the starting vertex is EAST, and wherein the travel direction from the starting vertex to the candidate vertex is SOUTH.

20. The system of claim 15, wherein the image comprises a writing board, and wherein the table is hand-drawn on the writing board with a marker.

\* \* \* \* \*